3,073,664
OIL-SOLUBLE RED DYE COMPOSITION AND PROCESS

Penn F. Spitzer, Jr., South Bound Brook, and Fridtjof Aagaard, Rahway, N.J., assignors to American Cyanamid Company, New York, N.Y., a corporation of Delaware
No Drawing. Filed Mar. 14, 1960, Ser. No. 14,505
8 Claims. (Cl. 8—79)

This invention relates to dyes and more particularly to blends of azo dyes having superior chemical and physical properties and to processes for preparing the same. The present invention is especially concerned with melted and specially treated red azo dye compositions which are free-flowing, non-dusting, non-caking, storage stable and markedly more readily oil-soluble than those heretofore available, and is also concerned with methods for producing the same.

Dyes for coloring petroleum products have been known and used for some time either for identification as to grade or origin or in some cases for sales appeal. For the coloring of hydrocarbon fuels, such as gasoline stock and fuel oil, such dyes must meet definite specifications as to melting point, solubility and rate of solution. Thus, in the dry dye eductor system wherein a suitable probe is inserted into a container of dry dye and the dye is carried by an air stream into the probe and then to a tank or moving stream of the petroleum product to be colored, it is essential that the dye be free of lumps, non-caking, and free-flowing. Since the dye is stored and used at temperatures as high as 65° C., it is necessary that the dye be free from caking at least at 65° C. and preferably at higher temperatures, to insure freedom from caking on long storage under more adverse conditions.

In addition to the need for non-caking material, the dye should be dustless in order to prevent contamination of other materials in the plant of the user of the dye, and in order to protect workers from contact with the dye since these materials present possible health hazards.

While many of the dyes currently available for coloring petroleum products possess some of these properties, none possess all of these properties. For example, dyes for this purpose can be dedusted by the use of light mineral oil, but the resultant products are prone to cake badly on storage at temperatures as low as 25–30° C. and exhibit poor flow. On the other hand, dyes of different chemical composition, having higher melting points, resist caking at 65° C., but either cannot be prepared in a dustless form or possess unsatisfactory solubility or rate of solution.

The present invention is based on the discovery that oil soluble red dyes of superior solubility and with free-flowing and non-caking properties result from melted and specially treated blends of 60 to 85% of the dye designated as Oil Red ED and 40 to 15% of the dye designated as Oil Red N1700. Oil Red ED (Color Index 258), 4-o-tolylazo)-o-toluidine coupled with beta-naphthol, may be represented by the following structural formula

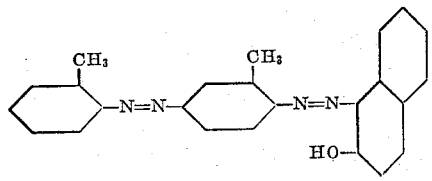

Oil Red N1700 is an azo dye mixture obtained by the diazotization of a mixture of toluidines and xylidines, the coupling of this mixture with a similar toluidines-xylidines mixture, followed by diazotization of the resulting amino-azo intermediate and coupling with beta-naphthol.

Hereinafter, throughout the specificaton and the appended claims, for the sake of convenience, the trade or common name Oil Red ED shall be employed rather than the technical name afforded this red dye, 4-(o-tolylazo)-o-toluidine coupled with beta-naphthol, and the trade or common name Oil Red N1700 shall be employed instead of referring to the azo dye mixture as one derived from diazotized aminoazotoluene-xylene coupled with beta-naphthol.

Oil Red ED has a desirable shade and is fairly non-caking, but dusts badly unless treated with mineral oil or other dedustant, with resultant caking, and has poor solubility and rate of solution. On the other hand, Oil Red N1700 has a desirable shade, good solubility and rate of solution, but cakes badly and is dusty. When attempts are made to reduce dusting by coating with various materials, caking is made worse.

The undesirable properties of these dyes may be slightly improved by various techniques, but such treatments are detrimental to other properties. For example, the addition of agents such as beta-naphthol reduces the benzene insolubles (i.e., it improves solubility) of Oil Red ED but this is not a sufficient improvement to render the product of interest inasmuch as such additives increase caking severely. Also, coarser grinding very slightly lessens dusting of Oil Red N1700, but the tendency to cake is unchanged.

However, it has now been found that mixtures of these two dyes, Oil Red ED and Oil Red N1700, when melted and pelletized or flaked in accordance with the process of this invention give a product with improved properties and no undesirable properties. Although Oil Red ED alone may be pelletized according to this process, its solubility and rate of solution are not enhanced. When Oil Red is N1700 alone is pelletized, the melting point is lowered to approximately 65° C., yielding a product which is unsatisfactory since it still has a tendency to cake.

Furthermore, the two constitutents of the blend may be prepared separately and then mixed intimately before melting in order to obtain the desired effects or such a mixture may be prepared by coupling certain suitable materials in the required proportions to give an equivalent mixture of the constituents capable of this treatment.

When the blends of 60 to 85% Oil Red ED and 40 to 15% of Oil Red N1700 are melted and specially treated in accordance with the present invention, a composition having the following characteristics is produced: melting point, 130° C. or higher; X-ray diffraction pattern showing three principal lines with interplanar spacing values 14.7 A., 7.65 A. and 3.35 A., with the strongest line at 7.65 A. and the next two lines in intensity at 14.7 A. and 3.35 A. The products may be further characterized in that they are non-dusting and remain free-flowing and non-caking after being maintained at a temperature of 98° C. for periods of three months or more.

The physical heat treatment of the melted particulated blend of Oil Red ED and Oil Red N1700 in the preparation of the product of this invention yields a material of a definite crystal form different from that of the amorphous form of the untreated material. This difference in crystal structure is observed in the X-ray diffraction pattern of the untreated blend and of the composition prepared in accordance with this invention. The untreated blend possesses an X-ray diffraction pattern having broad peaks, without principal lines for interplanar spacing values. Contrasted with the untreated blend, however, the composition of the present invention possesses a definite crystal structure with sharp eaks and with principal lines of interplanar spacing values.

While ordinary methods of blending, grinding, drying, flaking, and the like have proved unsatisfactory, we have found that several methods, each having its own critical limitations, may be employed for the preparation of this composition having improved oil solubility and non-caking properties. For convenience, these methods may be referred to as (1) water chilling process, (2) air chilling process, and (3) special flaking process.

In the water chilling process a molten blend of Oil Red ED and Oil Red N1700 is maintained at a temperature of 170° to 240° C. and is then poured into a spray of water held at any temperature preferably at about 20 to 30° C. The spray may be obtained by the use of any suitable nozzle and water pressure to give the desired particle size of the final product. A pressure of 35 p.s.i. is found to be quite satisfactory. By increasing the pressure and fineness of the water spray, finer particles may be produced. Particles in the range of 20 to 60 mesh are preferred. Irregular spheres with a melting point of 60 to 65° C. are produced. The isolated particles are dried and then subjected to a heat treatment (in any convenient medium-air being preferred) at 47 to 52° C. for at least 16 hours, and even as long a period as 72 hours, giving a product with a melting point greater than 130° C., having good solubility and non-caking properties. The particle size does not change appreciably during this heat treatment.

In an alternative method of carrying out the wet chilling process, the molten starting material may be added to water with rapid agitation and the product removed by filtration or by any other suitable method of separation. The particle size may be controlled by the extent to which the water is agitated and the time of agitation. For example, extended stirring with a very rapid agitation will reduce the particle size until ultimately a suspension of foam will result. However, it is preferred to use a mild agitation of short duration to obtain particles having the desired size. Although this method of water granulation and cooling is permissible, the particulation and chilling of a spray of the molten material by water is to be preferred.

In the air chilling process, the molten blend, maintained at a temperature of 170 to 240° C. and preferably at 200° C. is sprayed under pressure, preferably 30 to 50 p.s.i. into an air tower. An inert gas such as nitrogen may be used as a pressure pad. The temperature of the air is not critical. The product is then obtained in the form of small hollow spheres having a melting point of approximately 60 to 65° C. The product is then subjected to the hereinbefore referred to heat treatment at 47 to 52° C. for a period of at least 16 hours and even as long a period as 72 hours, giving a product with a melting point greater than 130° C., having good solubility and non-caking properties.

A third method of preparing the new products of our invention comprises melting the blend of Oil Red ED and Oil Red N1700 in the proper proportions at a temperature between 170 and 240° C. A drum whose surface is held at 110–130° C. is rotated in the melt and the thin film of solid which forms is separated from the drum in the form of flakes. These flakes, surprisingly, are in the new crystal form which we have discovered. The drum should preferably be immersed in the melt as little as possible while still picking up a thin film of the melt. The temperature in the drum is controlled by any convenient means, an internal charge of hot water and steam being one of the most convenient. In this process no further heat treatment is needed.

Our invention can be illustrated by the following examples, in which parts are by weight unless otherwise specified.

EXAMPLE 1

Water Chilling Process

Eighty-three parts by weight of Oil Red ED and 17 parts of Oil Red N1700 are dry blended, mixed thoroughly, and melted. The melted blend, maintained at a temperature of approximately 200° C., is then poured in a thin stream, essentially perpendicular, through a spray of water, whereby the stream of molten dye is sheared to particles having the shape of solid irregular spheres which are then cooled by the water which is maintained at a temperature of about 20 to 30° C. We prefer to use approximately 35 p.s.i. water pressure to effect a suitable spray giving approximately 20 mesh particles. The chilled pelletized product is then collected on a wire mesh screen or otherwise separated from the water. The product, of fairly uniform particle size, is then dried at temperatures of 48 to 49° C. for approximately 72 hours in air. This heat treatment raises the melting point of the product from 60 to 65° C. to over 125° C., usually about 150° C., and renders the product non-caking at 98° C.

EXAMPLE 2

Air Chilling Process

A mixture of 83 parts of Oil Red ED and 17 parts of Oil Red N1700, mixed and melted as described in Example 1 above, is forced under a pressure of 30 to 50 p.s.i. using an inert gas such as nitrogen, through an atomizing nozzle. The temperature of the melt is maintained at a temperature of about 200° C. After the product has been atomized and solidified, the product is collected at the bottom of the tower using a suitable collector and the particulate material is then heated at a temperaure from about 47° C. to 52° C. for a period of about 72 hours. The material so produced is in the form of hollow spheres. The heat treatment raises the melting point of the product from 60 to 65° C. to about 130° C.

EXAMPLE 3

Flaking Process

Although the composition of the present invention may be prepared by either the water chilling or the air chilling process whereby particles substantially in the form of spheres or pellets or pebbles are produced, it is also within the scope of this invention to prepare an oil soluble red dye product which is free flowing, crystalline and oil soluble and is in the form of flakes or scales or platelets. Preparation of these flakes, scales or platelets is illustrated in the following example:

Here the melt, at 170 to 240° C. (preferably 195–200° C.), is charged to the tray or pan of a drum type flaking apparatus, the temperature in the tray preferably being maintained at 195–200° C. The drum is rotated with the lower portion immersed in the pan (minimum immersion preferred), the drum surface temperature being maintained at 110 to 130° C. (120° C. preferred). The drum temperature is conveniently controlled using hot water in the drum at the required temperature plus steam, to maintain temperature. The drum temperature is particularly critical and too low temperatures produce tars or glasses. The solidified material is removed from the drum surface in the form of flakes or chips.

In the table which appears hereinafter, a comparison of the properties of Oil Red N1700, Oil Red ED and the blended product produced by the methods of Example 1, Example 2 and Example 3 are compared.

TABLE I

| Test | Specification | Oil Red N1700 | Oil Red ED | Water chilled | Air chilled | Flaked |
|---|---|---|---|---|---|---|
| Benzene insoluble | 2% max | 0.57% | 30-32% | 0.91% | 1.15% | 1.31%. |
| Dusting | None | Dusty | Dusty | Trace—none | None | None. |
| Caking, 65° C | Free-flowing | Mod. caked | Soft lumps | Free-flowing | Free-flowing | Free-flowing. |
| Caking, 85° C | | Hard caked | Hard caked | do | do | Do. |
| Caking, 98° C | | do | do | do | do | Do. |
| Shade, VS | Type | Type | M. bri | Yellow | Dull | Sl. yellow. |
| Strength, VS | 95-100% | 100% | 127% | 117% | 107.5% | 111.5%. |
| Shade, colorimeter | Type | Type | Sl. yell | Bri | Sl. bri | V. sl. yell. |
| Strength, colorimeter | 100±2.5% | 100% | 115-118% | 108% | 100% | 100%. |
| Rate of soln. in hydrocarbon of 1 part per thousand: | | | | | | |
| 15 minutes | 95% in soln. after 2 hrs | 98.6% | 77.7% | 61.6% | 66.9% | 55.5%. |
| 30 minutes | | 98.4% | 91.0% | 80.6% | 87.0% | 74.6%. |
| 45 minutes | | | 94.3% | 89.0% | 93.9% | 85.6%. |
| 60 minutes | | 98.3% | 100.0% | 95.6% | 99.5% | 99.5%. |
| Particle size | | | | 0.2 to 1.5 mm | 0.2 to 1.5 mm | 0.28 to 0.47 mm. |

EXAMPLE 4

To evaluate the optimum ratio of the components Oil Red ED and Oil Red N1700, a series of experiments is conducted in which it is determined that a range of Oil Red ED from 60 to 85 parts and from 40 to 15 parts of Oil Red N1700 gives a product with improved oil solubility and non-caking characteristics at elevated temperatures. In Table II are listed the properties of the various compositions as found from these experiments.

TABLE II

| Oil Red ED | 60 | 70 | 75 | 80 | 83 | 85 | 87.5 |
|---|---|---|---|---|---|---|---|
| Oil Red N1700 | 40 | 30 | 25 | 20 | 17 | 15 | 12.5 |
| Benzene insolubles (specification not greater than 2%) | 0.42% | 0.50% | 0.47% | 0.6% | 0.9% | 1.2% | 8.49%. |
| Softening point | 70-80° C | 120° C | 120° C | 125° C | 125° C | 130° C | 130° C. |
| Melting point | 146-148° C | 148-151° C | 153-155° C | 146-149° C | 157-160° C | 151-153° C | 151-153° C. |
| Caking, 85° C | Free-flowing | Free-flowing | Free-flowing | Free-flowing | Free-flowing | Free-flowing | Free-flowing. |
| Caking, 98° C | Sl. caked | V. sl. caked | V. sl. caked | do | do | do | Do. |

From Table II it is seen that if Oil Red ED is present in the original mixture, before melting, in an amount greater than 85% the solubility or amount of benzene insolubles is extremely high and is unacceptable for use in coloring petroleum products. In addition, if the amount of Oil Red ED is present in an amount less than 60%, the melting point of the pelletized material (approximately 65° C.) is too low to be of use.

Although the present invention has been described particularly with reference to the various proportions and process conditions set forth in examples hereinabove, it is possible to make various additions, omissions, substitutions and modifications, without departing from the scope of the invention.

We claim:

1. A process for preparing a free-flowing, crystalline, oil soluble red dye composition which comprises blending 60 to 85 parts by weight of Oil Red ED and 40 to 15 parts by weight of Oil Red N1700, heating the blend to melt temperatures of from about 170° to about 240° C., solidifying the melt in particulate form and heating the particulated solid at a temperature from about 47° C. to about 52° C. for a period of at least sixteen hours.

2. A process as in claim 1 wherein solidifying is accomplished by contacting a stream of the molten blend with water.

3. A process as in claim 2 wherein the water is in the form of a spray.

4. A process as in claim 1 wherein solidifying is accomplished by contacting a spray of the molten blend with an inert gas.

5. A process as in claim 4 wherein the inert gas is air.

6. A free-flowing crystalline oil soluble red dye composition prepared from a melted blend of 60-85 parts by weight of Oil Red ED and 40-15 parts by weight of Oil Red N1700 of substantially spherical form, having a melting point greater than 130° C. and having in its X-ray diffraction pattern the most intense interplanar spacing line at about 7.65 A., the next most intense lines at 14.7 A. and 3.35 A.

7. A process for preparing a free flowing, crystalline, oil soluble red dye composition which comprises blending 60-85 parts by weight of Oil Red ED and 40-15 parts by lot of Oil Red N1700, heating the blend to melt temperatures from about 170-240° C. forming a thin layer of the molten blend on a surface maintained at from about 110-130° C. and removing said layer from said surface in the form of flakes.

8. A free flowing crystalline oil soluble red dye composition prepared from a melted blend of 60-85 parts by weight of Oil Red ED and 40-15 parts of Oil Red N1700 in the form of flakes and having a melting point greater than 130° C. and in its X-ray diffraction pattern the most intense interplanar spacing line at about 7.65 A., the next most intense lines at 14.7 A. and 3.35 A.

References Cited in the file of this patent

UNITED STATES PATENTS

| | | |
|---|---|---|
| 2,071,492 | Boehmer | Feb. 23, 1937 |
| 2,684,908 | Drautz | July 27, 1954 |
| 3,004,821 | Gano | Oct. 17, 1961 |